United States Patent [19]
Sadiq

[11] Patent Number: 5,359,596
[45] Date of Patent: Oct. 25, 1994

[54] APPARATUS AND METHOD FOR FINDING BANDWIDTH AND MAKING CIRCUITS IN A TELECOMMUNICATIONS TRANSPORT NETWORK

[75] Inventor: Ghazala Sadiq, Raleigh, N.C.

[73] Assignee: Alcatel Network Systems, Inc., Richardson, Tex.

[21] Appl. No.: 955,293

[22] Filed: Oct. 1, 1992

[51] Int. Cl.$^5$ .................................... H04Q 11/04
[52] U.S. Cl. ........................................ 370/54; 370/66; 370/68; 370/118
[58] Field of Search .............. 370/53, 54, 58.1–58.3, 370/60, 60.1, 62, 66, 67, 68, 68.1, 85.7, 94.1, 118; 340/825.03, 826, 827; 379/219–221, 271–273

[56] References Cited

U.S. PATENT DOCUMENTS

| | | | |
|---|---|---|---|
| 4,686,669 | 8/1987 | Chang | 370/54 |
| 4,788,680 | 11/1988 | Kikuchi et al. | 370/68 |
| 4,905,233 | 2/1990 | Cain et al. | 370/54 |
| 4,991,204 | 2/1991 | Yamamoto et al. | 379/221 |
| 5,123,012 | 6/1992 | Suzuki et al. | 370/68 |

OTHER PUBLICATIONS

"Sonet Add/Drop Multiplex Equipment Administration Using the TIRKS® Provisioning System", D. Bailey, *IEEE Globecom* 1989, pp. 1511–1515.

*Primary Examiner*—Alpus H. Hsu
*Attorney, Agent, or Firm*—Dennis O. Kraft

[57] ABSTRACT

All available timeslots for interconnecting a circuit between two endpoints in a telecommunications network are considered for selecting and establishing the path wherein the selecting step may be carried out according to the rule of first feasible timeslot and wherein bandwidth may be determined as being equal to the lowest count among the timeslots determined to be feasible in each network element in a given path and wherein the total bandwidth in the network between two endpoints is determined by adding the bandwidths determined for each possible path.

7 Claims, 7 Drawing Sheets

FIG. 8
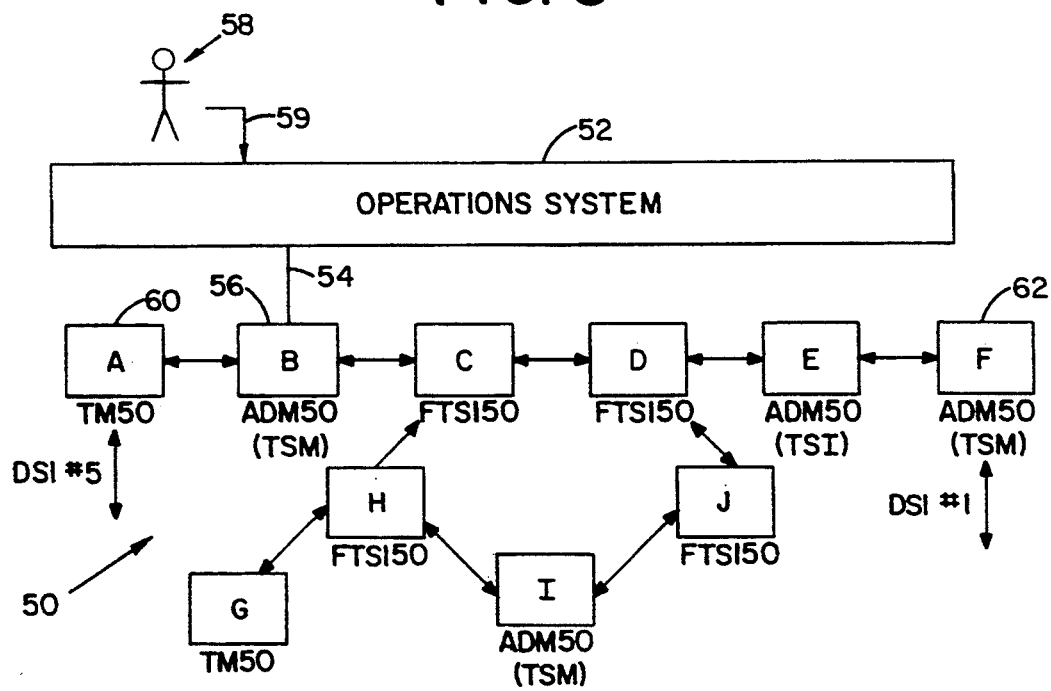
FIG. 10
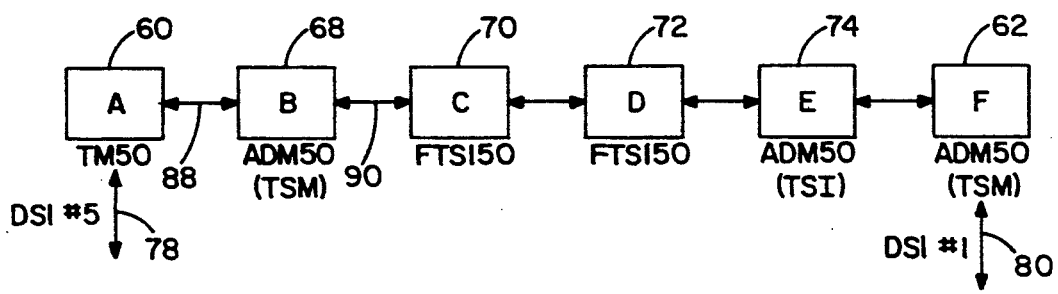
FIG. 11
| A TO B | B TO C, D, E | E TO F |
|---|---|---|
| 1 | 3 | 5 |
| 2 | 8 | 8 |
| 8 | 9 | 14 |
| 16 | 23 | 17 |
| 21-28 | 24 | 25 |
|  | 25 | 27 |
|  | 28 | 28 |

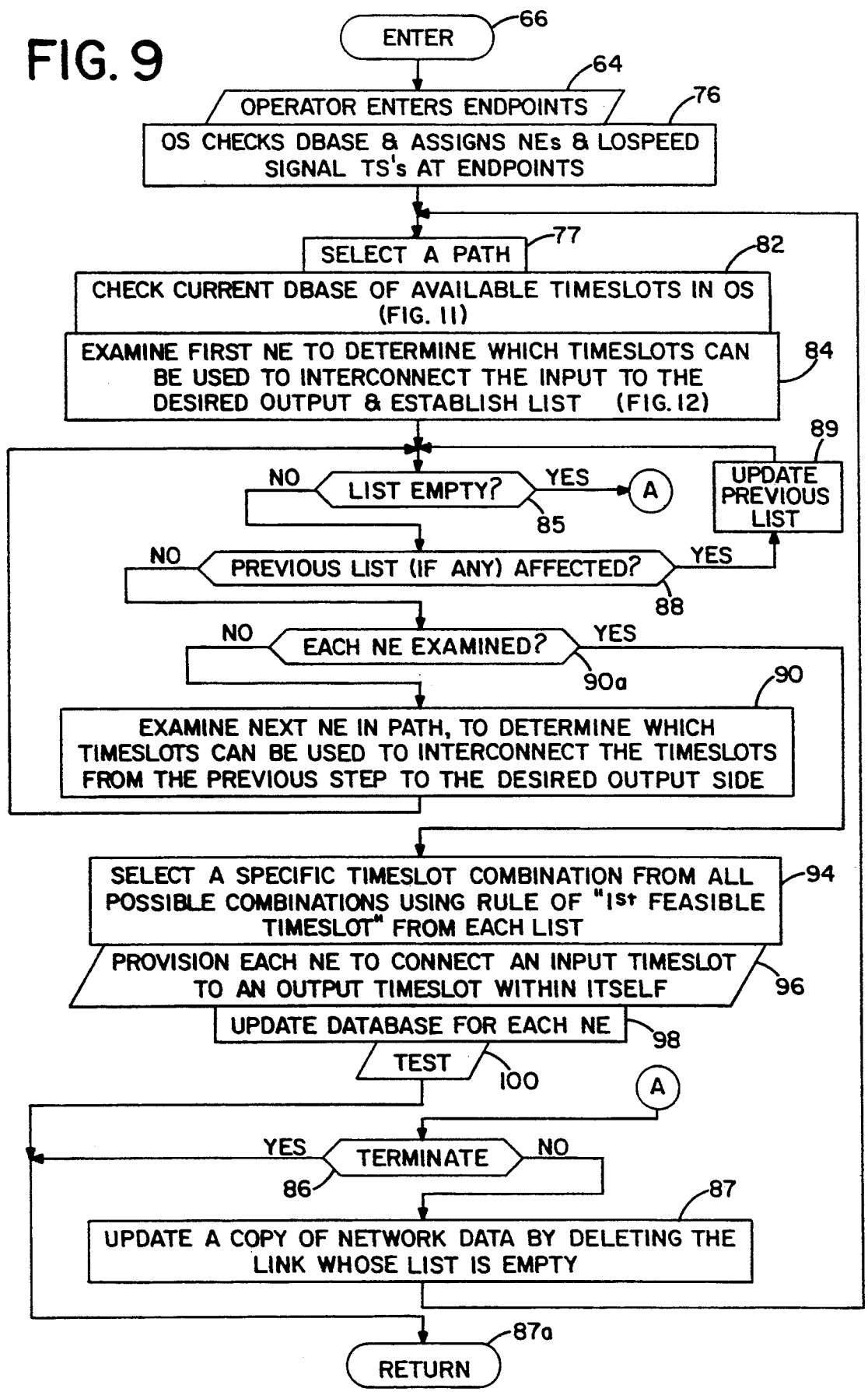

FIG. 12

| A TO B | B TO C, D, E | E TO F |
|---|---|---|
| 1 | – | – |
| 2 | – | – |
| 8 | – | – |
| 16 | – | – |
| 21-28 | – | – |

FIG. 13

| A TO B | B TO C, D, E | E TO F |
|---|---|---|
| 8 | 8 | – |
| 23 | 23 | – |
| 24 | 24 | – |
| 25 | 25 | – |
| 28 | 28 | – |

FIG. 14

| A TO B | B TO C, D, E | E TO F |
|---|---|---|
| 8 | 8 | 5 |
| 23 | 23 | 8 |
| 24 | 24 | 14 |
| 25 | 25 | 17 |
| 28 | 28 | 25 |
|  |  | 27 |
|  |  | 28 |

FIG. 15

| A TO B | B TO C, D, E | E TO F |
|---|---|---|
| 8 | 8 | 5 |
| 23 | 23 | 8 |
| 24 | 24 | 14 |
| 25 | 25 | 17 |
| 28 | 28 | 25 |
|  |  | 27 |
|  |  | 28 |

| A TO B | B TO C, D, E | E TO F |
|---|---|---|
| 8 | 8 | 5 |
| 23 | 23 | 8 |
| <u>24</u> | <u>24</u> | 14 |
| 25 | 25 | <u>17</u> |
| 28 | 28 | 25 |
|  |  | 27 |
|  |  | 28 |

| A TO B | B TO C, D, E | E TO F |
|---|---|---|
| <u>8</u> | <u>8</u> | <u>5</u> |
| 23 | 23 | 8 |
| 24 | 24 | 14 |
| 25 | 25 | 17 |
| 28 | 28 | 25 |
|  |  | 27 |
|  |  | 28 |

APPARATUS AND METHOD FOR FINDING BANDWIDTH AND MAKING CIRCUITS IN A TELECOMMUNICATIONS TRANSPORT NETWORK

TECHNICAL FIELD

This invention relates to telecommunications and, more particularly, to transport networks.

BACKGROUND OF THE INVENTION

Telecommunication network planners often need to know how much bandwidth is available between selected points for capacity planning purposes.

Telecommunications Operations personnel need to determine which timeslots to use for interconnecting a particular type of signal circuit between two end points.

There are some known methods for circuit planning and circuit set-up. For example, a Trunk Integrated Record Keeping System (TIRKS ®) has a method of finding bandwidth and finding timeslots for circuits. This method is explained in an article appearing in an IEEE GLOBECOM publication entitled "SONET Add/Drop Multiplex Equipment Administration Using the TIRKS ® Provisioning System" by Dianne E. Bailey.

However, this known method does not take full advantage of the cross-connect capabilities of today's network elements. Although it alludes to a future development in which the TIRKS ® system will be able to automatically rearrange time-slot assignments to optimize utilization of the SONET carrier system, no detailed teachings are provided.

DISCLOSURE OF INVENTION

An object of the present invention is to provide a method and apparatus for finding all sets of timeslots that can be used along a given path between two points for increasing utilization of the network.

Another object of the present invention is to provide a new use of an old method for selecting a path among available sets of timeslots.

According to the present invention, a set of timeslots is established by checking a current network database for available timeslots in each network element in a selected path and examining each network element in the path for determining which timeslots can be used to interconnect each network element's input to its output.

In further accord with the present invention, a timeslot combination is selected from all possible combinations in the path, and an input and an output in each network element is internally connected, according to the selected timeslot combination, for establishing the signal path in the network.

In further accord with the present invention, the selecting step may be carried out according to the rule of first feasible timeslot, a rule that is already known from other applications.

In still further accord with the present invention, bandwidth for a signal path in a network is determined by checking the current network database for available timeslots in each network element in the selected path, examining each network element in the path for determining which timeslots can be used to interconnect each network element's input to its output, counting the timeslots determined to be available in the previous step for each network element and determining the bandwidth as being equal to the lowest count.

The present invention finds bandwidth and feasible timeslots for a given path between two points in the network. However, in still further accord with the present invention, if the network planner needs to know the total bandwidth in the network between those two points, the planner will compute bandwidth on the first path, then update the list of available timeslots by eliminating the first n timeslots (where n is the bandwidth) from each list, eliminate the inter-NE connections that would become "unavailable" (i.e., those connections which had the lowest timeslot count) from further consideration, find another path between the same two points, and repeat the process of computing bandwidth until no more paths can be found between the two points. The sum of bandwidths found in each iteration is the total bandwidth between those two points.

If a facility planner who needs to establish a circuit cannot find a feasible timeslot in the first path, he would have to look at the network element identified by the present invention as the point where the process of finding timeslots fails. If this network element is an interim element in the given path, i.e., not one of the ends, he will have to eliminate the two inter-NE connections attached to this network element. If the network element is one of the ends, he will have to eliminate the single inter-NE connection. A new path would then have to be found between the points, and the process of finding feasible timeslots repeated until a timeslot is found, or there are no more paths in the network.

The present invention achieves optimized utilization of a network by taking an approach which maximizes the flexibility of each network element without resorting to a lowest common denominator approach. Moreover, by using the rule of first feasible timeslot, the probability of finding feasible timeslots for future circuits is increased, and in light of the teachings hereof, extensibility from a given path to an entire network is evident.

These and other objects, features and advantages of the present invention will become more apparent in light of the detailed description of a best mode embodiment thereof, as illustrated in the accompanying drawing.

BRIEF DESCRIPTION OF THE DRAWING

FIG. 8 is an illustration of a network made up of various elements shown in FIGS. 4–7 interfaced to an operations system operated according to the inventive steps of FIG. 9, having a human interface;

FIG. 9 shows a flow chart for a program for execution in the OS of FIG. 8, according to the invention, for establishing a circuit in the selected path shown in FIG. 10;

FIG. 10 shows an example, according to the present invention, to illustrate a path selected in the network of FIG. 8 according to known methods, but having a circuit established according to the invention;

FIG. 11 shows a listing of timeslots that are available in the various links of FIG. 10;

FIG. 12 shows a first step for examining network element A according to the steps of FIG. 9;

FIG. 13 shows a step for examining network element B according to the steps of FIG. 9;

FIG. 14 shows feasible timeslots existing after ignoring network elements C and D according to the steps of FIG. 9;

FIG. 15 shows examination of network element F, according to the steps of FIG. 9;

BEST MODE FOR CARRYING OUT THE INVENTION

Figure 1:
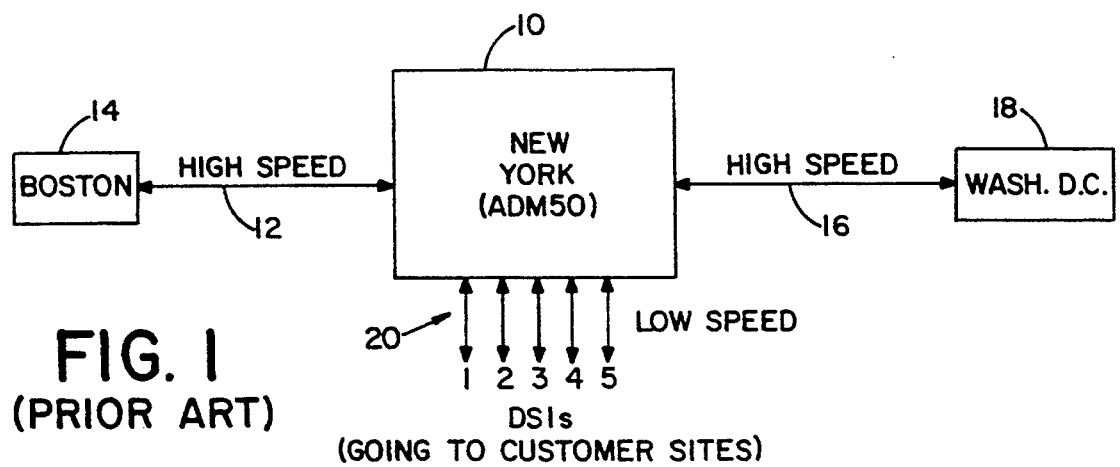
FIG. 1 is an illustration of a prior art add/drop multiplexer.

FIG. 1 shows an illustration of a prior art network element 10 located, for example, in New York City and corresponding for example to assignee's ADM50 (Add/Drop Multiplexer 50) product as disclosed for example in U.S. Pat. No. 5,185,736. Such a multiplexer can be interfaced to a west high speed interface 12 connected at its other end to a network element 14 in, for example, Boston. An east high speed interface 16 may also be connected to the network element 10 and be connected at its other end to a network element 18 in Washington, D.C. Customer sites (not shown) in New York City provide and receive low speed signals 20 which may, for example, be DS1s. In the digital signal hierarchy, one telephone signal occupies one DS0 signal and 24 DS0's equal one DS1 (or VT 1.5). The function of the add/drop multiplexer 10 shown in FIG. 1 is to cross-connect high speed signals east to west and west to east and also to cross-connect low speed signals from or to either high speed bus.

Figure 2:
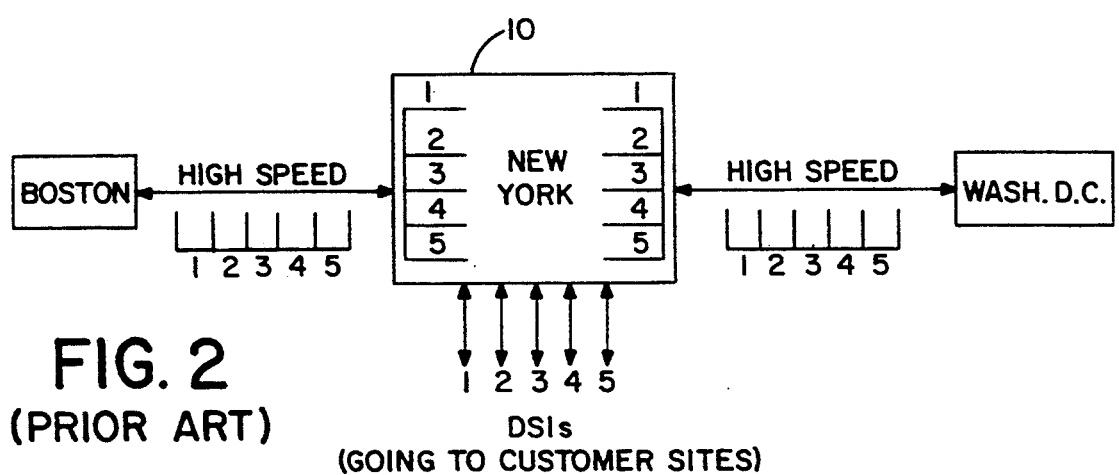
FIG. 2 is an illustration of timeslots on east and west sides of an add/drop multiplexer such as shown in FIG. 1.

FIG. 2 is similar to FIG. 1 except particularly showing the concept of timeslots on the high speed buses being capable of being cross-connected within the network element 10. Five separate timeslots are shown for simplicity on each high speed bus in serial form and are shown as being assembled in parallel form for cross-connection within a cross-connect (not shown) within the network element 10.

Figure 3:
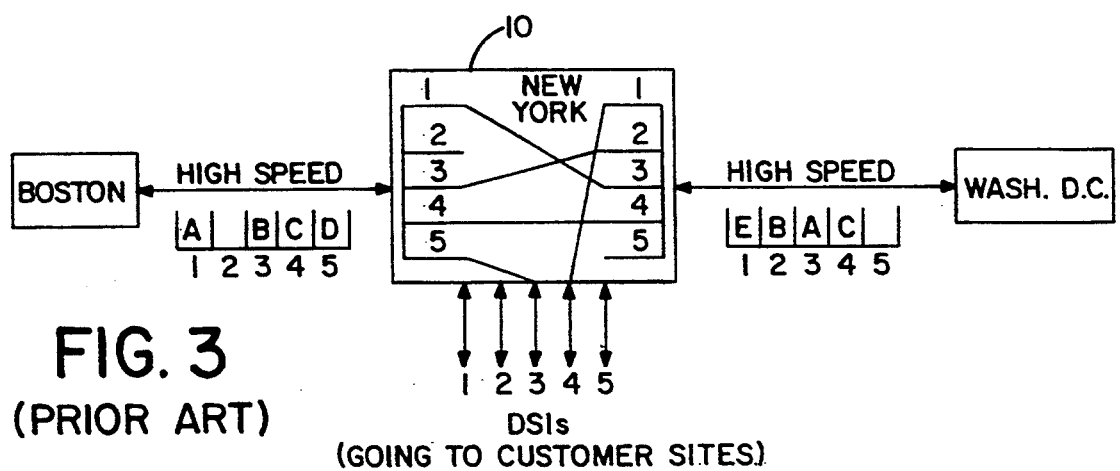
FIG. 3 is an illustration of a prior art add/drop multiplexer such as shown in FIGS. 1 and 2 having timeslot interchanger capability.

FIG. 3 is a further simplified illustration of a network element 10 similar to that shown in FIG. 1 except further showing a particular case of a cross-connection of particular timeslots in which the network element 10 has the capability of cross-connecting any timeslot on the east to any timeslot on the west and vice versa. In the particular case illustrated, timeslot 1 on the west is cross-connected to timeslot 3 on the east, timeslot 3 on the west is cross-connected to timeslot 2 on the east and timeslot 4 on the west is connected to timeslot 4 on the east. Thus, in FIG. 3 the network element 10 cross-connects three timeslots in high speed signals between high speed buses. Also shown is the cross-connection of timeslot 5 on the west to a low speed bus 3 for delivery to a DS1 bus 3 for delivery to customers or further breakdown for particular customers. Similarly, DS1 number 4 is cross-connected by the network element 10 to the high speed east bus in timeslot 1 designated as a signal E.

FIGS. 1–3 have thus illustrated the concept of timeslots in a network element. FIGS. 4–7 will now describe timeslot interchangeability capabilities of various network elements.

Figure 4:
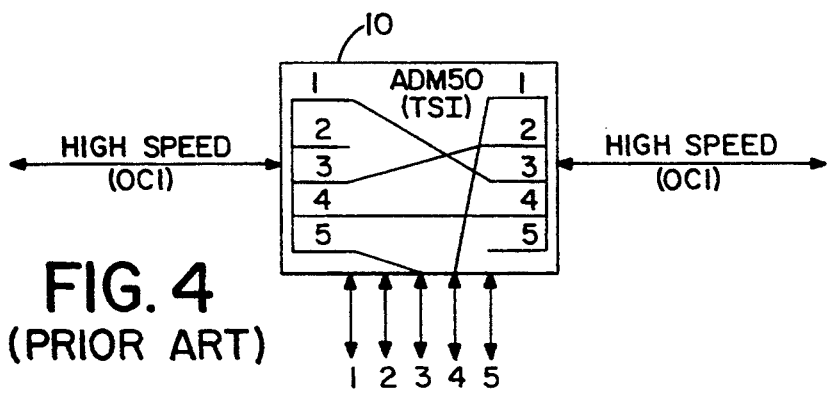
FIG. 4 is an illustration of a prior art add/drop multiplexer such as shown in FIG. 3 for interfacing with high speed optical buses and, in particular, OC-1 optical buses.

FIG. 4 shows the network element of FIG. 3 repeated for the purpose of illustrating that the network element 10 may be an ADM50 having timeslot interchanger capability, according to the assignee's product line. This particular ADM50 product is capable of interfacing east and west high speed optical OC-1 buses. As known in the digital signal hierarchy, 28 DS1s equal one DS3 or STS1 in the electrical domain which corresponds to an OC-1 signal in the optical realm.

Figure 5:
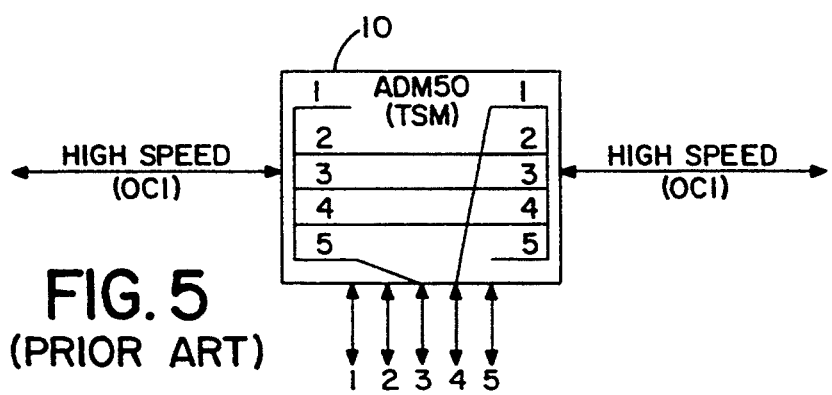
FIG. 5 shows a prior art add/drop multiplexer such as shown in FIG. 1 having only timeslot multiplexer capability for interfacing with high speed optical buses (OC-1)

FIG. 5 shows that the network element 10 of FIG. 1 may instead be an ADM50 only having timeslot multiplexer capabilities. In other words, a particular timeslot on one of the high speed buses may only be cross-connected to the same timeslot on the opposite high speed bus. An illustration is shown in FIG. 5 whereby timeslots 2, 3 and 4 on the west side are directly cross-connected to timeslots 2, 3 and 4, respectively, on the east side. The timeslots which are not being used for cross-connecting high speed buses are either idle (as timeslot 1 on the west side and timeslot 5 on the east side), or employed to cross-connect low speed buses, as shown for example by the west number 5 timeslot being connected to DS1 number 3 and the east number 1 timeslot being connected to DS1 number 4.

Figure 6:
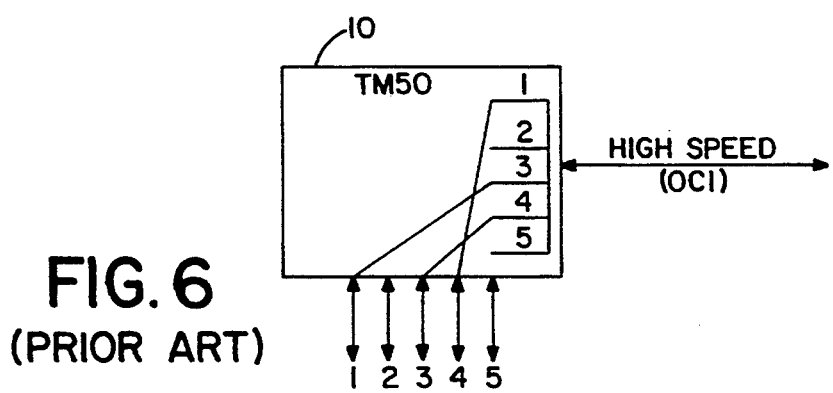
FIG. 6 is an illustration of a prior art terminal multiplexer having the capability of interfacing only one high speed bus for cross-connecting lower speed signals.

Another possible network element type for the network element 10 of FIG. 1 would be a terminal multiplexer such as shown in FIG. 6 having the capability to interface with only one high speed bus such as an OC-1 optical signal. Such a terminal multiplexer has the capacity to cross-connect high speed signals to low speed signals, as shown for example with high speed timeslot number 1 cross-connected to DS1 number 4, high speed timeslot number 3 cross-connected to DS1 number 1, and high speed timeslot number 4 cross-connected to DS1 number 3.

Figure 7:
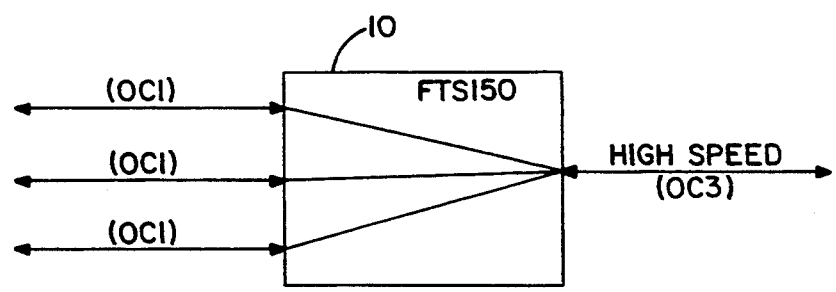
FIG. 7 is an illustration of a bi-directional multiplexer/demultiplexer for multiplexing low speed optical signals such as OC-1 to a higher speed signal such as OC-3 and for demultiplexing high speed signals to low speed signals.

Another type of network element which might be used for the network element of FIG. 1 might be another of assignee's product line, i.e., an FTS 150, as shown in FIG. 7, which has the capacity to multiplex three OC-1 level signals to a single OC-3 high speed signal and vice versa.

FIG. 8 shows a number of network elements such as shown in FIGS. 4–7 interconnected in a network 50 under the control of an operation system 52 which may be connected as shown by a signal line 54 connected to a network element "B" (56), which may be an ADM50 such as shown in FIG. 5 having timeslot multiplexer capabilities only. The connection line 54 may communicate with all of the network elements in the network 50 through the network element 56. For example, the connection line 54 may be a serial link having bi-directional information transmitted thereon. The information may be inserted in preselected control timeslots in repetitive time frames used to communicate between the network elements in the network 50. The operations system 52 may also be connected directly to each network element (not shown). The method of communicating with the individual network elements is not important here as such may be established by any of the known methods of controlling the establishment and maintenance of dedicated networks such as the network 50 shown in FIG. 8. Such networks may have a human operator 58 and therefore the operation system 52 will have a man-machine interface such as a keyboard and display for allowing the human operator 58 to evaluate bandwidth, select circuit paths, enter commands on a line 59 and evaluate network conditions and responses.

A typical scenario might begin with the user of the network communicating with the phone company to provide a DS1 circuit between two particular locations. The human operator then determines either himself or through the aid of the operation system 52 that the two locations may be served by a timeslot in a network element A (60) and a timeslot in network element F (62). If done by aid of an operation system 52, this step might appear, for example, as shown in FIG. 9 at a step 64 which indicates that the operator 58 enters the two locations in the operations system 52 which has a database that can match up the two locations with timeslots within particular network elements serving those locations and display those to the operator 58. The step 64 is shown being executed after a step 66 which merely indicates an interruption of any other program that may be running in the operation system at the time that the operator 58 interrupts and causes a subroutine as shown in FIG. 9 to be executed.

FIG. 9 shows a step 76 in which the phone company checks its database and assigns low speed signal timeslots at the end points. For example, as shown in FIG. 10, DS1 number 5 (78) is assigned in network element A (60) and DS1 number 1 (80) is assigned in network element F (62). As mentioned previously, all of these steps may be accomplished by the human operator 58 as opposed to the operation system 52.

A step 77 is next executed by the operation system 52 in which a path is selected. There are several well known algorithms to do this step and do not form the subject of the present invention and therefore will not be described here. The path selected by the particular algorithm utilized in step 77 for this example is shown in FIG. 10 as being a path through a series of network elements 60, 68, 70, 72, 74, 62. Each of the network elements shown in FIG. 10 correspond to one of the types shown in FIGS. 4–7 previously in connection with assignee's product line. The overall function of these types of equipment, as opposed to the details thereof, are already known in the industry, however, and the nature of these network elements is therefore not the subject of the present invention. They are presented merely as an example using particular equipment known to Applicant, and the invention is not restricted thereto.

The method of the present invention is used at this point to accomplish timeslot assignment through each network element 60, 68, 70, 72, 74, 62 shown in FIG. 10.

A step 82, according to the present invention, checks the current database of available timeslots in the operating system or in TIRKS ®. For example, the database may appear as follows:
Database for A:
Low Speed Side: Not concerned (since the input, i.e. DS1 #5 is given)
East: 1, 2, 8, 16, 21, 22, 23, 24, 25, 26, 27, 28
Database for B:
Low Speed Side: Not concerned
West: 1, 2, 8, 16, 21, 22, 23, 24, 25, 26, 27, 28 (Same as A's East)
East: 3, 8, 9, 23, 24, 25, 28
Database for C:
Not concerned
Database for D:
Not concerned
Database for E:
Low Speed Side: Not concerned
West: 3, 8, 9, 23, 24, 25, 28 (Same as B's East)
East: 5, 8, 14, 17, 25, 27, 28
Database for F:
Low Speed Side: Not concerned (since the output, i.e. DS1 #1 is given)
West: 5, 8, 14, 17, 25, 27, 28 (Same as E's East)

These assumed available timeslots (i.e., not currently used) are summarized in FIG. 11. Network elements C (70) and D (72) are ignored because they do not add, drop or interchange timeslots. Each timeslot is assumed to be available in both the transmission and receive directions for the example.

After completing a check of the current database as shown in step 82 and as ascertained as summarized in FIG. 11, a step 84 is next executed in which the first network element "A" (60) is examined to see which timeslots can be used to interconnect the input (i.e., DS1 number 5 (78)) to the desired output side (i.e., high speed side in this example). Since, for the example, a TM50 can connect a low speed timeslot to any timeslot on the high speed side, the result is tabulated in FIG. 12 showing available timeslots on the A to B link.

A step 85 is next executed, in which a determination is made as to whether or not an input-output list for the network element (NE) is empty. By this is meant whether there is one or more input timeslots for the NE that can be connected to an output timeslot or not. Such link lists will be discussed later in connection with FIGS. 14–17. If so, a step 86 is next executed, in which a decision is made as to whether or not to terminate or to ask for another path based on operator input or the subroutine itself. If not, a step 87 is executed to update a copy of network data by deleting the link whose list is empty. The step 77 is next executed in order to obtain another path from the OS or operator. If so, a return is made, as indicated in a step 87a. If the step 85 determines that the list was not empty, a step 88 is next executed in order to determine if the previous list (if any) is affected. The previous list is affected if an input timeslot in the current list cannot be connected to any output timeslot. Such a timeslot is deleted from the previous list. If so, the previous list is updated, examined for being empty or not, and the next previous list is examined, as indicated in a cycle of steps 89, 85, 88. Eventually, the step 88 will determine either that there is no previous list, or that the previous list is not affected, and a step 90a will next be executed, in which a determination is made as to whether each network element in the path selected in step 77 has been examined or not. If not, a step 90 examines the next network element in the path to determine which timeslots can be used to interconnect the timeslots from the previous step to the desired output side.

For the example, network element "B" (68) is examined to determine which timeslots can be used to interconnect the timeslots from the previous step 84 to the desired output side. Since an ADM 50, as shown in FIG. 5, equipped with TSM, can only connect same numbered timeslots between its two high speed ports, it cannot connect inputs timeslot number 1 (on an A to B link 88) to the output (on a B to C link 90), since timeslot number 1 is not available at the output (see FIG. 11 for the A to B link list and B to C link list). Similarly, it cannot connect input timeslots numbered 2, 16, 21, 22, 26 and 27 to the output link 90. The feasible timeslots after this step and after updating previous lists (iterations of the steps 85, 88 and 89) are shown in FIG. 13.

The step 85 is next executed again, as shown in FIG. 9, in which a determination is made as to whether the list is empty or not. If not, the steps 88, 89 or 90a, 90 are repeated until a list is found empty in step 85 or until the step 90a determines that each and every network element in the path has been examined.

For the particular example shown in FIG. 10, step 90a determines that additional network elements need to be examined and the procedure from step 90 is repeated a number of additional times. As it happens for the example, both network elements "C" (70) and "D" (72) are FTS150 devices as shown in FIG. 7 and are not capable of interchanging timeslots and step 90 may have a subroutine (not shown) for ignoring these network elements from the examination process. They do not contribute or hinder timeslot assignment in any way. So the next network element to consider after network elements 70, 72 is network element 74("E") which is an ADM50 as shown in FIG. 4, equipped with timeslot interchangeability. Since network element 74 can connect any timeslot to any timeslot, all input slots (i.e., timeslots numbered 8, 23, 24, 25, 28) can be connected to all available output slots. Thus, after the examination in step 90 of network element "E" (74) and execution of steps 85 and 88 (which reveal that the previous list is not affected), the feasible timeslots are shown in the list or table shown in FIG. 14.

Step 90a next determines that not all of the network elements have been examined and that step 90 has to be repeated again to examine network element F (62), the terminating network element. Since the ADM50 62 is equipped with TSM as shown in FIG. 5, it can connect any timeslot at the input (high speed) to the output (DS1 number 1 on low speed side), and there are no further changes to the timeslots already found. The final set is shown in FIG. 15, which is the same as FIG. 14.

Step 90a next determines that each network element has in fact been examined and a step 94 is next executed in which, according to the present invention, a known rule is utilized in a new application of the rule to select a specific timeslot combination from all possible combinations available.

Figures 16, 17, 18:
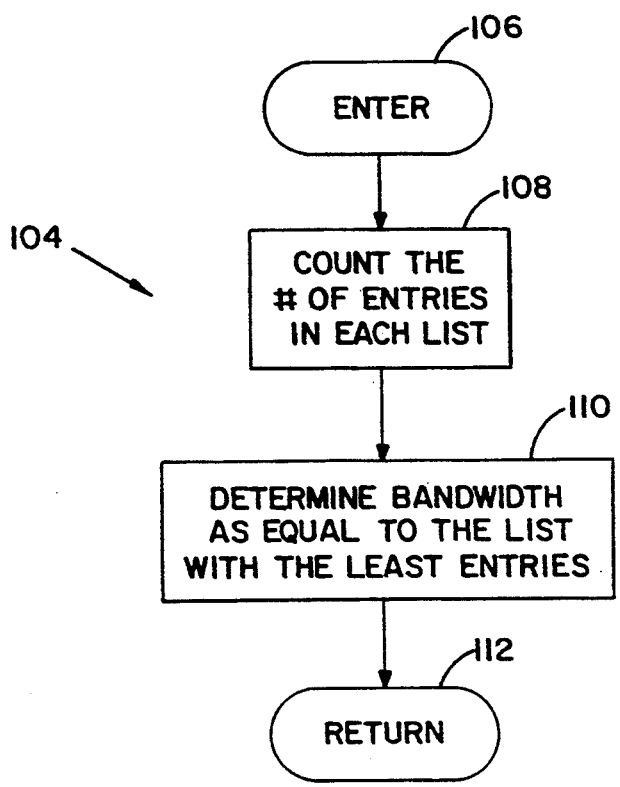
FIG. 16 shows an example of timeslots that may be selected to make a circuit according to the steps of FIG. 9.
FIG. 17 shows an example, according to the present invention, for selecting timeslots according to a rule of "first feasible timeslot" according to the steps of FIG. 9.
FIG. 18 shows a flowchart for a program for execution in the OS of FIG. 8 for determining bandwidth, according to the present invention.

If we are looking for timeslots to make the circuit, several combinations of the timeslots found above can be used. For example, we could use the timeslots that are highlighted in FIG. 16. Even though several combinations are feasible and may be used, according to the broadest teachings of the present invention, it is best to have a rule to select a specific timeslot combination from all possible combinations. The old rule used in this new application, according to the present invention, is the rule of "first feasible timeslot" from each list. This approach is not only easier than random selection, but also results in less mismatches (blocking) of timeslots later. This rule is actually quite important because it reduces the probability of "blocking" considerably. According to this rule, in for example a step 94, the method selects the following combinations for the example of FIG. 10 as shown in FIG. 17. These timeslots imply the following cross-connections to be made for the circuit.

Crossconnect DS1 #5 to VT1.5 #8 (on A-B link) in NE A

Crossconnect VT1.5 #8 (A-B link) in to VT1.5 #8 (B-C link) in B

Crossconnect VT1.5 #8 (D-E link) in to VT1.5 #5 (E-F link) in E

Crossconnect Timeslot #5 (E-F link) to DS1 #1 in F.

After the step 94 selects a specific timeslot combination, the phone company can then provision each network element as shown in a step 96 to connect an input timeslot to an output timeslot within itself in keeping with the selected timeslot combinations determined in step 94. The database for each network element is then updated in the OS as shown in a step 98 to reflect the current usage of timeslots.

When all network elements are provisioned, the phone company then tests, as indicated in a step 100, the established circuit by making sure that data gets from DS1 number 5 in network element A to DS1 number 1 in network element F and vice versa without errors. After completion, a return is made as indicated in the step 87a and the customer may be notified that the circuit can be used.

If, instead of making a circuit, the operator 58 of FIG. 8 is simply looking for DS1 bandwidth for the given path between network elements A and F, the number of entries in each of the lists previously described in connection with FIGS. 11–15 can be counted automatically by a program similar to that shown in FIG. 9. For the above example, A to B link has five entries, B to C has five entries, and E to F has seven entries. The least number of entries determines the bandwidth. The DS1 bandwidth in this example is therefore 5. In other words, one could make a maximum number of 5 DS1 circuits between A and F. After that, the list of feasible DS1 timeslots on links A-B and B-C would be exhausted. FIG. 18 shows a subroutine 104 which may be used in the operating system 52 of FIG. 8 to accomplish the bandwidth determination automatically. After entering the subroutine 104 in a step 106, the number of entries in each list are counted in a step 108. A step 110 next determines the bandwidth as being equal to the list with the least number of entries. A return is then made in a step 112.

Figure 19:
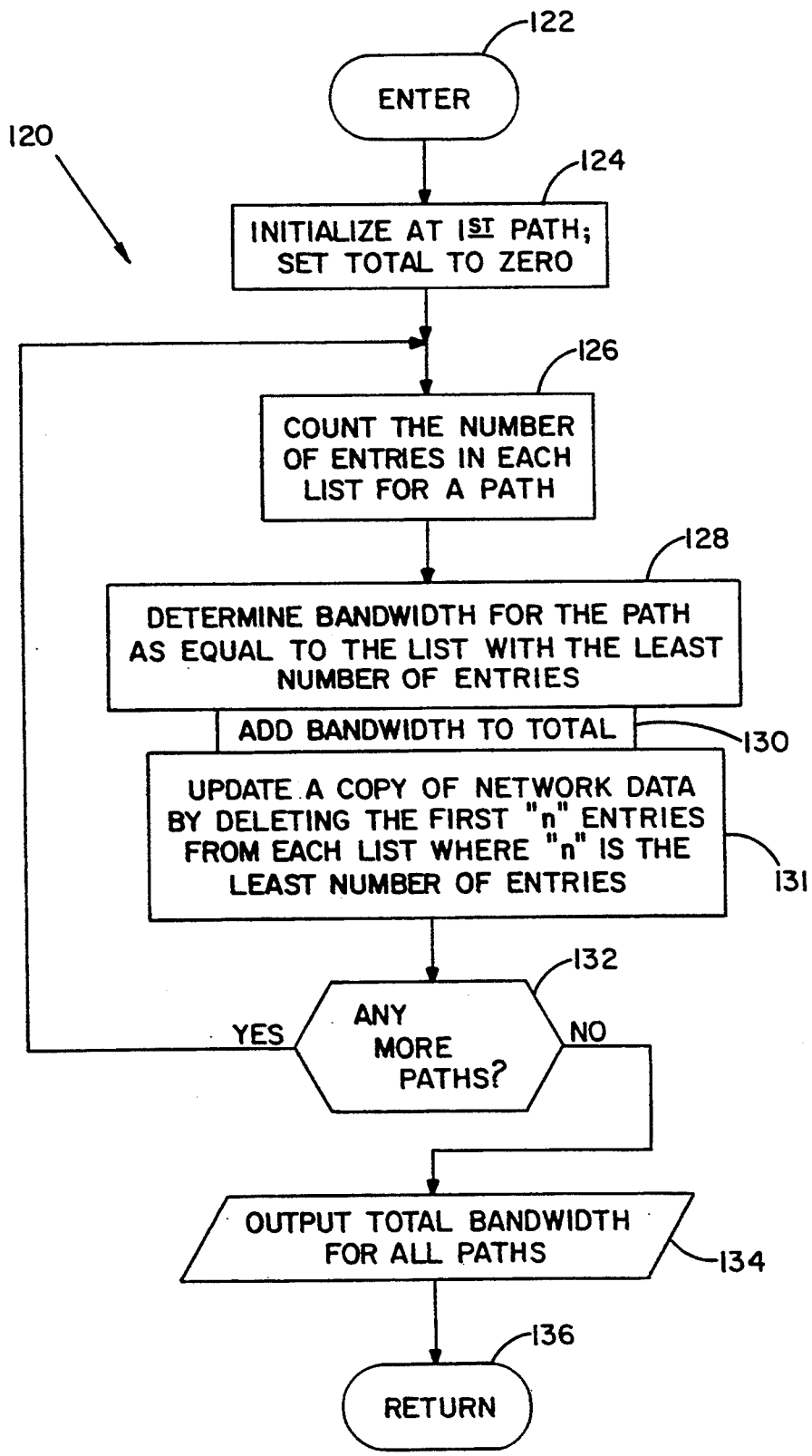
FIG. 19 shows a flow chart for a program for execution in the OS of FIG. 8 for determining bandwidth in the entire network, according to the present invention.

Further, according to the present invention, the entire bandwidth of the network between the two end points may be determined, as shown in FIG. 19, by determining the bandwidth for each possible path between the end points and adding up the bandwidths. For example, as shown in a subroutine 120, after entering in a step 122, and initializing at the first selected path, as indicated in a step 124, the number of entries in the first path in each list for the first path, is indicated in a step 126. The bandwidth is determined in a step 128 for that first path, as described previously in connection with FIG. 18. A step 130 next adds the bandwidth determined in step 128 to the total bandwidth for the network, which was set to zero in step 124. So, after executing steps 126 and 128 for the first path, the total bandwidth added in step 130 after the first path is equal to the bandwidth of the first path. Next, in a step 131, a copy of the network data is updated by deleting the first n timeslots along each link, where n is the least number of entries in all the lists. These are the timeslots that would have been consumed if one made the n circuits. They are simply removed from further consideration in the total bandwidth determination. A step 132 next determines whether there are any more possible paths within the network between the two selected end points. If so, steps 126, 128, 130 are re-executed for that path and again re-executed for any more paths that may exist. After it is finally determined in step 132 that no more paths exist, a step 134 is executed, in which the total bandwidth is output for all possible paths between the selected end points within the network, and a return is made in a step 136. Of course, it has been assumed in the above description of the subroutine 120 of FIG. 19 that the appropriate steps of the subroutine of FIG. 9, e.g., steps 84, 85, 88, 89, 90 have been executed to determine the lists, before we "count the number of entries in each list" in step 126.

Although we have assumed, in the example, that the circuits are capable of operating bi-directionally, a case where this is not the case would nevertheless be handled in exactly the same way. In other words, a uni-direction circuit/bandwidth determination is handled the same way except that the difference is in what is considered "feasible." A timeslot that may be considered unavailable (and therefore infeasible) for a bi-directional circuit may be available for a uni-directional circuit. The timeslot interchangeability constraints may also be different. However, the algorithm is the same.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method for centrally establishing a selected, dedicated signal path between two endpoint timeslots in a preselected network path having a plurality of network elements having different timeslot interchangeability constraints, comprising the steps of:

checking a current network database for available timeslots in each network element in the preselected network path;

sequentially examining each of the plurality of network elements in the preselected network path for determining which of the available timeslots can be used to interconnect an input timeslot of a network element being examined, which is the same as an output timeslot of a preceding network element, to an output timeslot of the network element being examined while respecting the timeslot interchangeability constraints thereof and establishing a list for each of the plurality of network elements in the preselected network path of all output timeslots that can be used wherein, for an input timeslot that cannot be so used, deleting that input timeslot from the list of the preceding network element and determining, as a consequence of the step of deleting, if an input timeslot in any further preceding network element cannot any longer be connected to any output timeslot and deleting any such timeslot from the list of that further preceding network element;

selecting a set of timeslots by selecting a first timeslot in each list, in the preselected network path; and connecting the selected set of timeslots for establishing the selected, dedicated signal path.

2. The method of claim 1, further comprising the steps of:

establishing for each network element in the preselected network path a list of output timeslots that can be connected from its available inputs to its available outputs while respecting timeslot interchangeability constraints of the network elements;

counting the timeslots in each list; and determining available capacity of the preselected path as being equal to the count of the network element with a lowest timeslot count.

3. The method of claim 2, further comprising the steps of repeating the steps of claim 2 and updating network data for each possible network path between the selected endpoint timeslots and determining a total available capacity of the network between those two endpoint timeslots by adding the available capacity determined according to the steps of claim 2 for each possible path.

4. A method for determining available capacity for a preselected network path between selected endpoint network elements in a network of network elements, comprising the steps of:

establishing for each network element in the preselected network path a network database list of output timeslots that can be connected from its available inputs to its available outputs while respecting timeslot interchangeability constraints of the network elements;

counting the timeslots in each list; and determining the available capacity of the preselected path as being equal to the count of the network element with a lowest timeslot count.

5. The method of claim 4, further comprising the steps of repeating the steps of claim 4 and updating network data for each possible network path between the selected endpoint network elements and determining the total available capacity of the network between those two endpoint network elements by adding the available capacity determined according to the steps of claim 4 for each possible path.

6. A method for centrally establishing a selected, dedicated signal path between two endpoint timeslots in a preselected network path having a plurality of network elements having different timeslot interchangeability constraints, comprising the steps of:

establishing, for each network element in the preselected network path, a network database list of output timeslots that can be connected from its available inputs to its available outputs while respecting timeslot interchangeability constraints of the network elements;

selecting a set of timeslots in the preselected network path by selecting a first timeslot in each list; and connecting the selected set of timeslots for establishing the selected, dedicated signal path;

counting the timeslots in each list; and determining available capacity of the preselected path as being equal to the count of a network element with a lowest timeslot count.

7. The method of claim 6, further comprising the steps of repeating the steps of claim 9 by establishing lists for each possible network path between the two endpoint timeslots and determining a total available capacity of the network between those two endpoint timeslots by adding an available capacity determined according to the steps of claim 9 for each possible path.

* * * * *

UNITED STATES PATENT AND TRADEMARK OFFICE
CERTIFICATE OF CORRECTION

PATENT NO. : 5,359,596
DATED : October 25, 1994
INVENTOR(S) : G. Sadiq

It is certified that error appears in the above-indentified patent and that said Letters Patent is hereby corrected as shown below:

At column 11, line 5, please change "claim 9" to --claim 6--;

at column 12, line 4, please change "claim 9" to --claim 6--.

Signed and Sealed this

Seventh Day of March, 1995

Attest:

BRUCE LEHMAN

Attesting Officer

Commissioner of Patents and Trademarks